Figure 1:
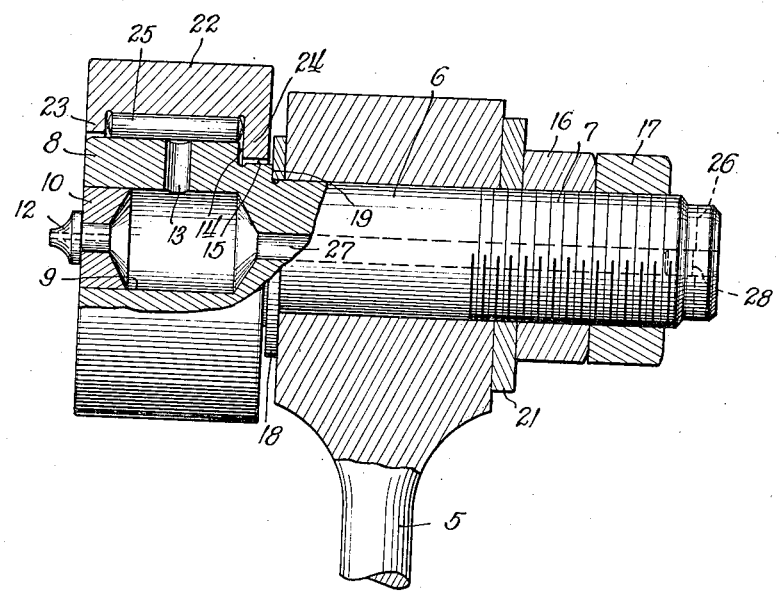

May 11, 1943.  S. R. THOMAS  2,318,903
CAM FOLLOWER
Filed July 26, 1941

INVENTOR.
Stanley R. Thomas.
BY Walter E. Schirmer
Atty.

Patented May 11, 1943

2,318,903

UNITED STATES PATENT OFFICE 2,318,903

CAM FOLLOWER

Stanley R. Thomas, Lyons, Mich., assignor to Bantam Bearings Corporation, South Bend, Ind., a corporation of Indiana Application July 26, 1941, Serial No. 404,189

4 Claims. (Cl. 74—569)

This invention relates to cam followers, and more particularly is directed to an improvement over the structure shown in my copending application, Serial No. 247,751, filed December 27, 1938.

In the present form of invention, I have provided a construction which eliminates the using of the locking snap ring previously employed, but at the same time, provides the advantages inherent in that construction and introduces a novel type of locking arrangement which eliminates any loading upon the outer race ring or cam roller other than the radial load imposed thereon by the cam. In addition, the present construction employs a substantially conventional type bearing assembly, and insures that the surfaces against which the cam follower race contacts are hardened surfaces.

Another feature of the present invention is the provision of an outer race member having an inwardly extended radial lip or flange at one end which forms means for locking the member against axial displacement, this locking arrangement being provided by means of a shoulder on the stud holding the race ring from axial movement in one direction, and a washer pressed against a second shoulder on the stud which functions to hold the roller against axial movement in the opposite direction.

With the present construction, the rollers or anti-friction members are confined axially between opposite inturned flanges on the outer race member, and the necessity of machining any grooves in either the lips or in the head portion of the stud is eliminated.

Other objects and advantages of the present invention will appear more fully from the following detailed description which, taken in conjunction with the accompanying drawing, will disclose to those skilled in the art the particular construction and operation of a preferred form of the present invention.

Figure 2:
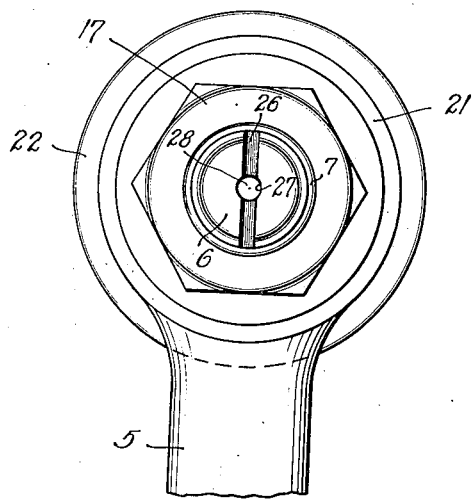

In the drawing:

Figure 1 is a sectional view through a cam follower embodying the present invention; and Figure 2 is an end elevational view of the structure shown in Figure 1.

Referring now in detail to the drawing, I have shown in Figure 1 a crank arm 5 which is connected to any suitable mechanism, and is adapted to be actuated by means of the cam follower. The arm 5 is provided with a journal portion receiving the stud indicated generally at 6, this stud being provided with a threaded end portion 7 and with the enlarged head portion 8. The head portion 8 of the stud is axially recessed as indicated at 9, the outer end of this recess being closed by the plug 10, which is apertured to receive the lubricant fitting 12. The chamber 9 is provided with the radial ports 13, whereby lubricant may be discharged radially toward the outer annular surface 8 of the stud. The stud 6 is provided at the inner end of the head portion with the radially inwardly directed shoulder 14 and the axially extending annular surface 15. These two surfaces are formed by first taking a piece of stock of the diameter to which the head portion 8 is to be formed, and cutting an annular groove therein which forms the surfaces 14 and 15, the stud being of uniform diameter except for this groove. The stud is then subjected to a suitable heat treatment, which hardens the surfaces about the head portion 8 and the shoulders 14 and 15, and the remaining portion of the stud is then cut away to form the extension fitting through the arm 5 and receiving the nuts 16 and 17. Thus, the shoulders 14 and 15 are left hardened while the remainder of the stud is relatively softer, facilitating the cutting of the threads 7. A suitable washer 18 is then pressed over the stud up against the shoulder 19 between the annular surface 15 and the reduced portion of the stud, and is held thereagainst by the journal portion of the arm 5, the washer 20 and the nuts 16 and 17. This, in effect, forms a channel between the radial face of the washer 18, the surface 15 and the radial shoulder 14. The roller itself comprises a race member 22 which is provided with the end flanges 23 and 24 extending radially inwardly. The flange 24 is of appreciably greater radial extent than the flange 23, and is adapted to extend into the channel formed between surfaces 14, 15 and the washer 18. Confined between the inner faces of the flanges 23 and 24 are the anti-friction rollers or needle members 25, which are thereby restrained against axial movement relative to the roller 22 and mount the roller 22 for rotation about the hardened surface of the head portion 8 of the stud. The flange 24, due to its extension into the channel, locks the outer race member 22 against axial movement outwardly of the head 8 or inwardly toward the arm 5, thereby insuring that the roller will not be pressed against the arm and allowing it to rotate freely on the head end of the stud. Thus a locking engagement is effected between the outer race 22 and the head end of the stud to insure that the roller 22 will be maintained in proper axial position, this engagement being effected without requiring the use of snap rings or the like.

In the assembly of this construction, the needle bearings 25 are first placed in the outer race member 22. This race member is then inserted from the threaded end of the stud into position over the head portion of the stud, its location being determined by the abutment of the flange 24 against the shoulder 14. The washer 18 is then moved over the stud 6 up against the shoulder 19, and is held thereagainst by the assembly being inserted through the journal portion of the arm 5, with the washer 21 being then placed in position, after which the nuts 16 and 17 are threaded over the threaded end 7 of the stud. Preferably, one or the other end of the stud is provided with a screw driver slot, indicated at 26, whereby the nuts may be properly tightened on the stud after it has been inserted into the arm. The lubricant passageway 27 which extends from the lubricant chamber 9 through the stud portion axially is closed at the opposite end by means of a plug 28, although it will be apparent that if desired, the lubricant fitting 12 may be placed at the opposite end of the stud, and the screw-driver slot may be made in the head portion thereof.

It is therefore believed that I have provided a novel arrangement for securing the outer roller of a cam follower in position on the stud, and, while changes may be made in certain details of the present construction, I do not intend to be limited except as defined by the scope and spirit of the appending claims.

I claim:

1. In a cam follower, a stud having an extended shank portion, a radial shoulder thereon, an annular cylindrical surface of larger diameter extending axially from said shoulder, a second radial shoulder at the opposite end of said surface, a still large diameter cylindrical head portion extending axially from said second shoulder, an outer race member of an axial length substantially equal to the total axial extent of said head portion and surface and having radially inturned flanges at opposite ends thereof closely encircling said head portion and said surface limiting axial movement of said race member away from said shank portion, means rotatably supporting said member on said head portion, and a washer disposed over said shank portion against said first radial shoulder limiting axial movement of said member toward said shank portion.

2. In a cam follower, a stud having an enlarged cylindrical head portion at one end and a reduced axially extending shank portion, an intermediate annular shoulder between said head and shank portions defined at its ends by radial surfaces extending outwardly to said head portion and inwardly to said shank portion, an outer race member having radially inturned flanges at its ends defining therebetween a bearing raceway, rollers therein journalling said member on said head portion, one end flange closely encircling said head portion and the other closely encircling said shoulder, and a washer disposed against the radial surface between said shoulder and shank portion whereby said other flange is confined between said radial surfaces for limiting axial movement of said race member in either direction.

3. In a cam follower, a stud having an enlarged cylindrical head portion at one end and a reduced axially extending shank portion, an annular shoulder of intermediate diameter disposed between said head portion and said shank portion, an outer race member of an axial length equal to that of said head portion plus said shoulder, means for rotatably journalling said member on said head portion, a radially inturned flange on one end of said race member closely encircling the head portion, a radially inturned flange at the opposite end of said member of a smaller internal diameter closely encircling said shoulder and limiting axial displacement of said member over said head portion away from said shank portion, and means on said shank portion of a diameter greater than said last named flange abutting said shoulder and forming a radial abutment for said last-named flange limiting axial movement of said race member in the opposite direction.

4. A cam follower comprising a stud having a head portion and a reduced axially extending shank portion separated by an annular shoulder of intermediate diameter, an outer race member of an axial length greater than said head portion having a radially inturned flange at one end adapted to fit closely around said head portion, means at the shank end of said head portion and spaced therefrom by said shoulder defining with the radially extending surface between said shoulder and said head portion an outwardly opening annular channel, a radially inturned end flange at the opposite end of said race member extending into said channel and closely encircling said shoulder limiting axial movement of said race member relative said head portion, and means confined in said race member between said flanges rotatably journalling said member on said head portion.

STANLEY R. THOMAS.